United States Patent
Kim et al.

(10) Patent No.: US 6,692,203 B2
(45) Date of Patent: Feb. 17, 2004

(54) AUTOMATIC CONTAINER LOCKING APPARATUS FOR TRAILERS

(75) Inventors: Young Rak Kim, Ulsan (KR); Sang Rak Kim, Ulsan (KR); Se Jong Park, Ulsan (KR)

(73) Assignee: Kummyung Precision Manufacturing Co., Ltd., Ulsan-shi (KR)

( * ) Notice: Subject to any disclaimer, the term of this patent is extended or adjusted under 35 U.S.C. 154(b) by 0 days.

(21) Appl. No.: 10/181,415

(22) PCT Filed: Jan. 18, 2001

(86) PCT No.: PCT/KR01/00082
§ 371 (c)(1),
(2), (4) Date: Jul. 23, 2002

(87) PCT Pub. No.: WO01/54945
PCT Pub. Date: Aug. 2, 2001

(65) Prior Publication Data
US 2003/0063958 A1 Apr. 3, 2003

(30) Foreign Application Priority Data
Jan. 27, 2000 (KR) .......................................... 2000-4080

(51) Int. Cl.[7] ................................................. B60P 7/08
(52) U.S. Cl. ............................ 410/69; 410/70; 410/72; 410/73; 410/76; 410/82; 410/83
(58) Field of Search ............................. 410/69, 70, 72, 410/73, 76, 82, 83; 280/406.1; 248/500, 503, 681

(56) References Cited

U.S. PATENT DOCUMENTS

| | | | | |
|---|---|---|---|---|
| 4,626,155 A | * | 12/1986 | Hlinsky et al. | 410/82 |
| 4,697,967 A | * | 10/1987 | Schulz et al. | 410/82 |
| 4,776,736 A | * | 10/1988 | Tatina | 410/83 |
| 5,267,819 A | * | 12/1993 | Lycett | 410/82 |
| 5,356,249 A | * | 10/1994 | Hove | 410/83 |
| 5,765,977 A | * | 6/1998 | Reynard | 410/82 |
| 5,893,692 A | * | 4/1999 | Asanuma | 410/83 |
| 5,927,916 A | * | 7/1999 | Kroll et al. | 410/83 |
| 6,092,967 A | * | 7/2000 | Schulz et al. | 410/82 |

FOREIGN PATENT DOCUMENTS

| | | | | |
|---|---|---|---|---|
| EP | 301876 A1 | 2/1989 | | B60P/7/13 |
| JP | 57-100542 | 6/1982 | | B60P/3/00 |

* cited by examiner

Primary Examiner—Stephen T. Gordon
(74) Attorney, Agent, or Firm—Jacobson Holman PLLC

(57) ABSTRACT

The object of this invention is to provide an automatic container locking apparatus for trailers. This locking apparatus is automatically operable in response to the weight of a container to lock or unlock the container on the deck of a trailer. This locking apparatus has a housing (10) vertically set in the deck (1), with a spring-biased actuator (20) movably set within the housing (10). A spring-biased locking bolt (30) having a top head (31) is movably set within the actuator (20). This locking bolt (30) has a stopper (32) and a curved guide slit (41), thus being selectively moved together with the actuator (20) while being rotated. A support shaft (50) holds the vertical position of the locking bolt (30) within the housing (10). An actuation pin (51) of the shaft (50) engages with the curved guide slit (41), thus allowing the locking bolt (30) to be rotatable when the locking bolt is vertically moved together with the actuator (20).

1 Claim, 8 Drawing Sheets

AUTOMATIC CONTAINER LOCKING APPARATUS FOR TRAILERS

This is a nationalization of PCT/KR01/00082 filed Jan. 18, 2001 and published in English.

TECHNICAL FIELD

The present invention relates, in general, to an automatic container locking apparatus for trailers and, more particularly, to an automatic container locking apparatus, installed in the deck of a trailer and automatically operable in response to the weight of a container to lock or unlock the container on the deck of the trailer, thus securely and safely holding the container on the deck while transporting the container on a road, and being convenient to workers while loading or unloading the container onto or from the deck of the trailer.

BACKGROUND ART

As well known to those skilled in the art, a container is a large, vanlike, reusable box for consolidating smaller crates or cartons into a single shipment, designed for easy and fast loading and unloading of freight. Such a container is loaded on a trailer, and is transported by a truck tractor on a road In order to hold such a container on the deck of a trailer while transporting the container on a road, a plurality of locking apparatuses are installed in the deck at predetermined positions. Such an installation of the locking apparatuses on the deck of a trailer is prescribed by law.

FIGS. 1a and 1b are sectional views, showing an operation of a conventional container locking apparatus for trailers when the locking apparatus locks a container in position on the deck of a trailer. As shown in the drawings, the conventional container locking apparatus, installed in the deck 1 of a trailer at a predetermined position, comprises a locking bolt 2. This locking bolt 2 is vertically movable and rotatable by an actuation of a lever 3, thus locking or unlocking a container 4 on the deck 1. In order to lock the container 4 to the deck 1, the container 4 is primarily seated on the deck 1 at a predetermined position. Thereafter, the lever 3 of the locking bolt 2 is manipulated by a worker to fully insert the top head 2' of the locking bolt 2 into a locking hole 5 formed on the bottom of the deck 1, thus locking the container 4 in position on the deck 1.

Therefore, the locking apparatus holds the container 4 on the deck 1 of the trailer while transporting the container on a road, and prevents the container 4 from being undesirably moved on the deck 1 or unexpectedly dropped from the deck 1 onto the road during such transportation.

However, such conventional container locking apparatuses for trailers are somewhat difficult to manipulate, and so some workers or drivers of truck tractors often neglect to lock the containers in position on the decks of trailers. When a container is transported on a road while being not locked to the deck of a trailer as described above, the container may be undesirably moved on the deck or unexpectedly dropped from the deck onto the road. Particularly when the truck tractor, with the trailer seating a container thereon without being locked to the deck of the trailer, turns a corner or encounters an uneven surface of a road, the container may be more easily removed from the deck 1 to cause severe traffic accidents.

DISCLOSURE OF THE INVENTION

Accordingly, the present invention has been made keeping in mind the above problems occurring in the prior art, and an object of the present invention is to provide an automatic container locking apparatus for trailers, which is installed in the deck of a trailer, and is automatically operable in response to the weight of a container to lock or unlock the container on the deck when it is desired to load or unload the container onto or from the deck.

In order to accomplish the above object, the present invention provides an automatic container locking apparatus for trailers, comprising a housing vertically set in the deck of a trailer at a predetermined position, an actuator having a hollow structure with a central opening, the actuator being axially and movably set within the housing while being normally biased upward by a first compression coil spring such that the actuator is vertically extendible and retractable relative to the upper end of the housing, a longitudinal locking bolt having a head at its upper end and movably and concentrically set within the central opening of the actuator such that the locking bolt is removably inserted into a locking hole of a container at the head, with a stopper externally formed on the sidewall of the locking bolt at a predetermined position to selectively come into contact with the lower surface of the actuator, thus allowing the locking bolt to be selectively and vertically movable in conjunction with a vertical movement of the actuator, a hole longitudinally formed at the center of the locking bolt while extending from the lower end of the locking bolt to a predetermined depth, with a curved guide slit formed on the sidewall of the locking bolt to communicate with the hole, a support shaft vertically standing within the housing while being fixed to the bottom lid of the housing at its lower end, the support shaft being axially, upwardly and movably inserted into the hole of the locking bolt from the lower end of the locking bolt, with a second spring set within the hole of the locking bolt to normally bias the locking bolt upward, and an actuation pin formed on the sidewall of the support shaft at an upper portion, and movably engaging with the curved guide slit of the locking bolt, thus allowing the locking bolt to be rotatable relative to the actuator at a predetermined angle when the locking bolt is vertically moved in response to external pressure applied from the container downward to the actuator.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1A:
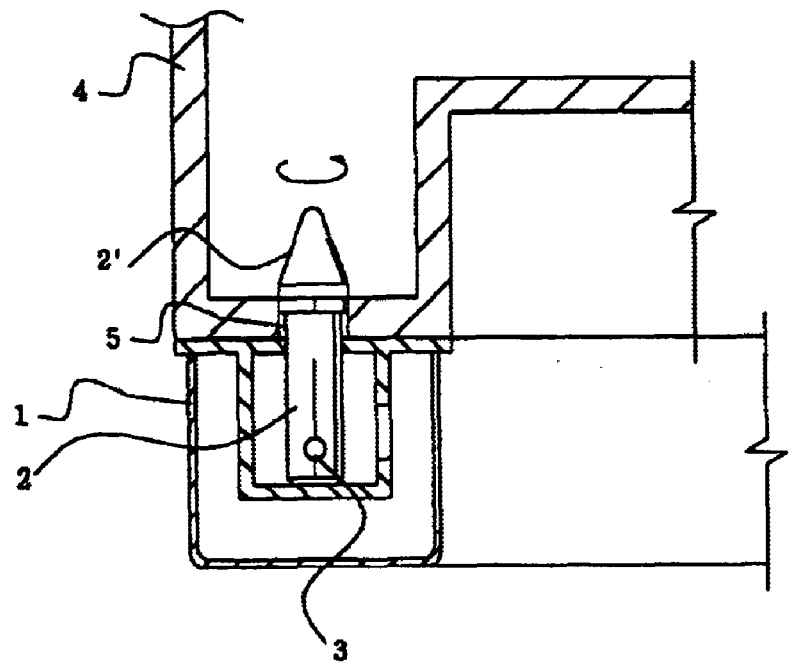
FIGS. 1a and 1b are sectional views, showing an operation of a conventional container locking apparatus for trailers when the locking apparatus locks a container in position on the deck of a trailer.
Figure 1B:
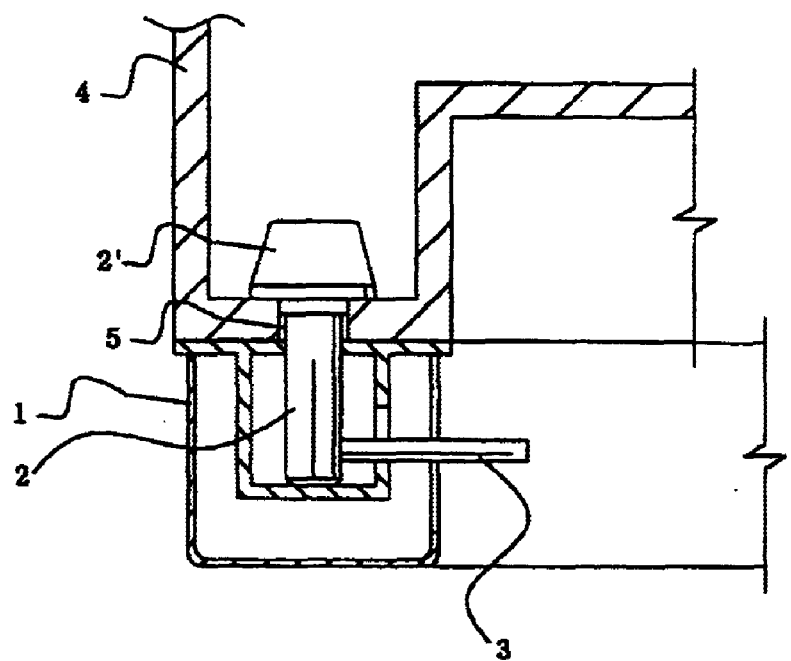

Reference now should be made to the drawings, in which the same reference numerals are used throughout the different drawings to designate the same or similar components.

Figure 2:
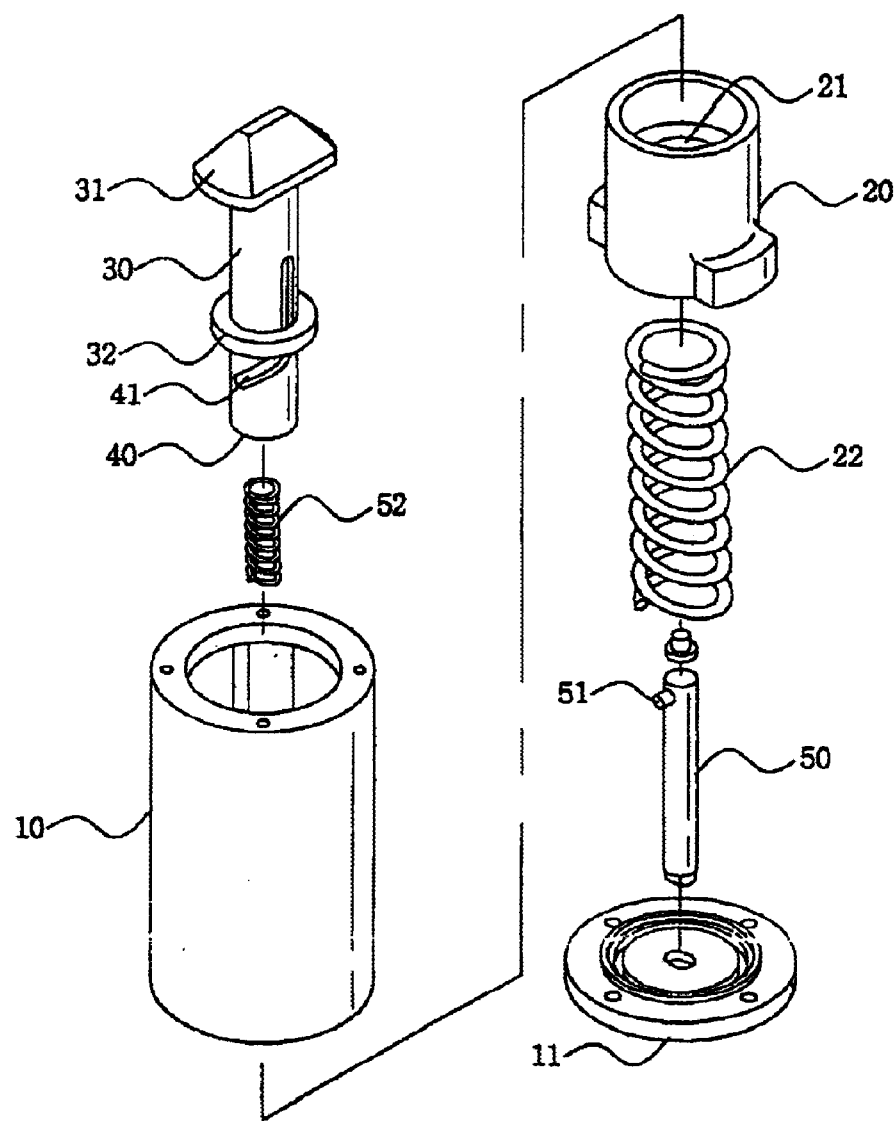
FIG. 2 is an exploded perspective view of an automatic container locking apparatus for trailers in accordance with the preferred embodiment of the present invention.
Figure 3:
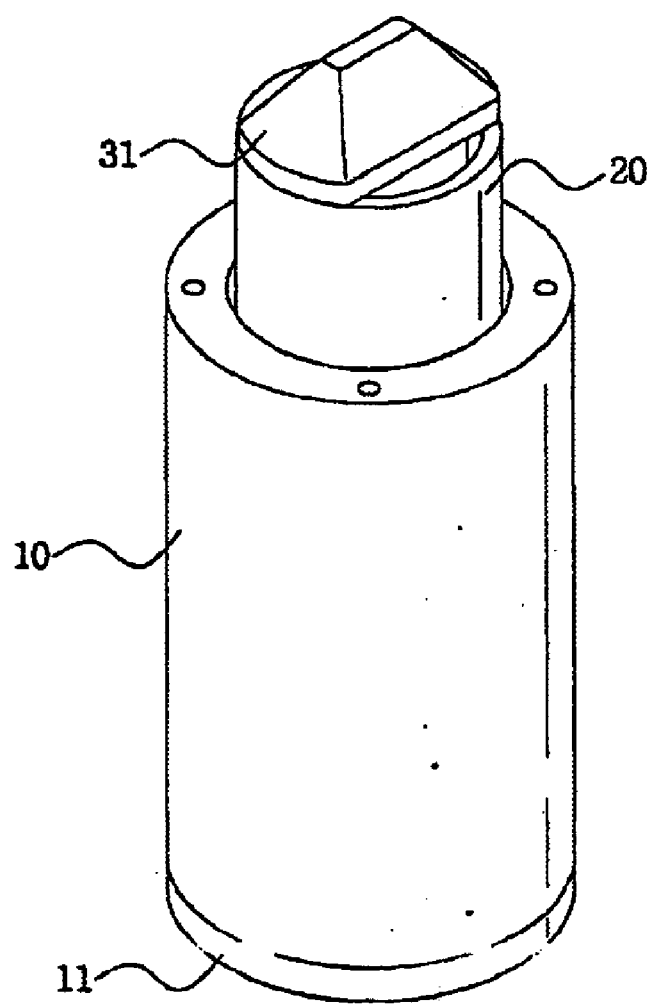
FIGS. 3 and 4 are a perspective view and a sectional view of the container locking apparatus of this invention, with the parts of the locking apparatus completely assembled into a single body.
Figure 4:
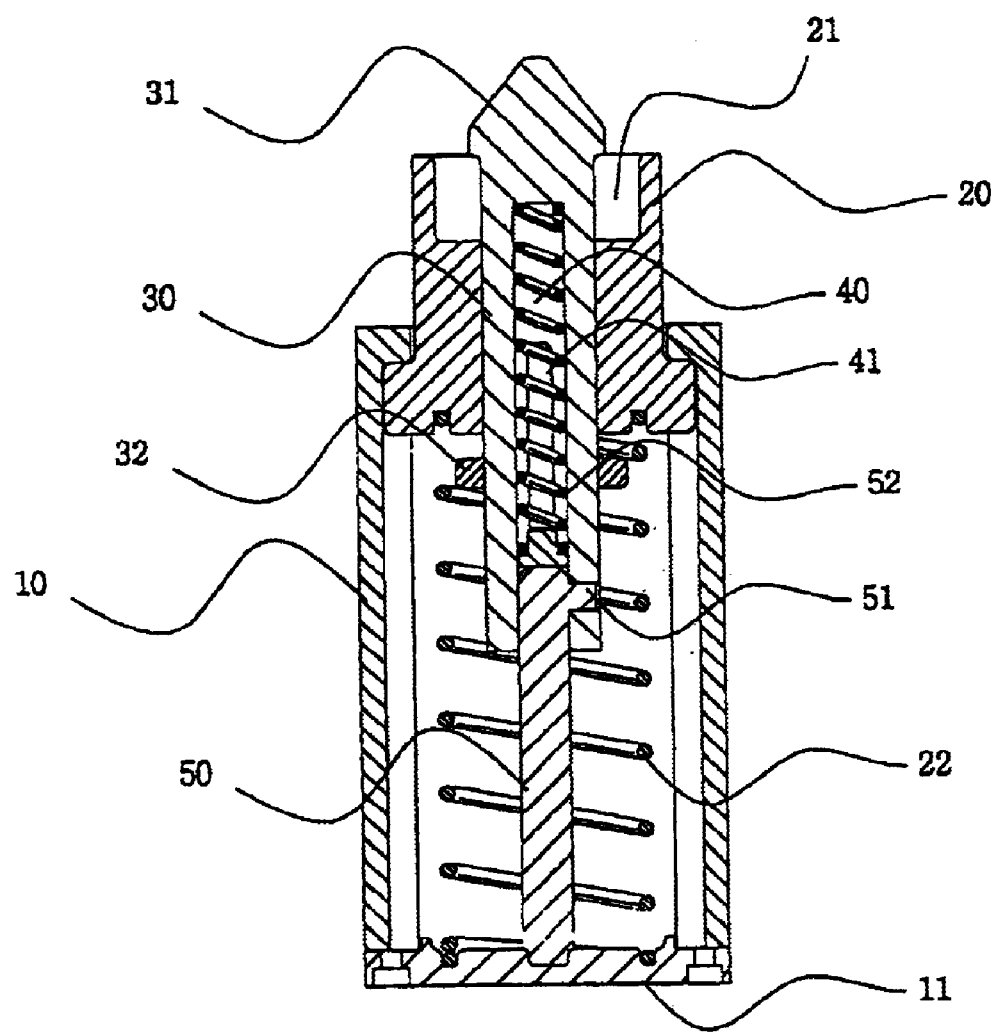

FIG. 2 is an exploded perspective view of an automatic container locking apparatus for trailers in accordance with the preferred embodiment of the present invention. FIGS. 3 and 4 are a perspective view and a sectional view of the container locking apparatus of this invention, with the parts of the locking apparatus completely assembled into a single body As shown in the drawings, the automatic container locking apparatus for trailers of this invention comprises a housing 10, which is vertically set in the deck of a trailer at a predetermined position. A cylindrical actuator 20, having a hollow structure with a stepped central opening 21 formed at the center of the actuator 20, is axially and movably set within the housing 10 while being normally biased upward by a first compression coil spring 22 such that the actuator 20 is extendible and retractable relative to the upper end of the housing 10 A longitudinal locking bolt 30, having a head 31 at its upper end, is movably and concentrically set within the central opening 21 of the actuator 20 such that the locking bolt 30 is removably inserted into a locking hole of a container at the head 31. A stopper 32 is externally formed on the sidewall of the locking bolt 30 at a predetermined position to selectively come into contact with the lower surface of the actuator 20, thus allowing the locking bolt 30 to be selectively and vertically movable in conjunction with a vertical movement of the actuator 20.

A hole 40 is longitudinally formed at the center of the locking bolt 30. This hole 40 extends from the lower end of the locking bolt 30 to a predetermined depth A guide slit 41, having a curved profile, is formed on the sidewall of the locking bolt 30 to communicate with the hole 40. This curved guide slit 41 allows the locking bolt 30 to be rotatable relative to the actuator 20 at a predetermined angle as will be described later herein when the locking bolt 30 is moved in response to external pressure applied downward to the locking bolt 30.

A support shaft 50 is axially, upwardly and movably inserted in the hole 40 of the locking bolt 30 from the lower end of the locking bolt 30, with a second compression coil spring 52 set within the hole 40 at a position between the inside end of the hole 40 and the top end of the support shaft 50. The lower end of the housing 10 is firmly closed by a bottom lid 11, while the support shaft 50 is fixed to the bottom lid 11 at its lower end. An actuation pin 51 is formed on a sidewall of the support shaft 50 at an upper portion, and movably engages with the curved guide slit 41, thus allowing the locking bolt 30 to be rotatable relative to the actuator 20 at the predetermined angle when the locking bolt 30 is vertically moved.

Figure 5A:
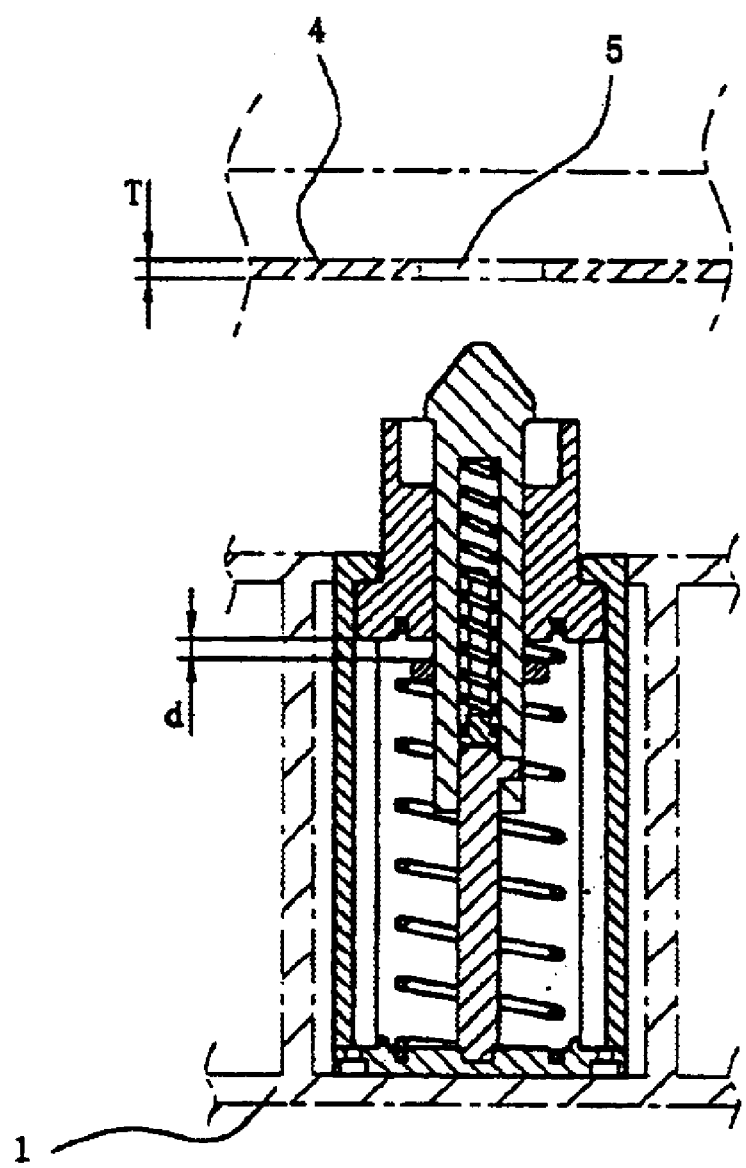
FIGS. 5a to 5c are sectional views, showing an operation of the container locking apparatus of this invention when the locking apparatus locks a container in position on the deck of a trailer.
Figure 5B:
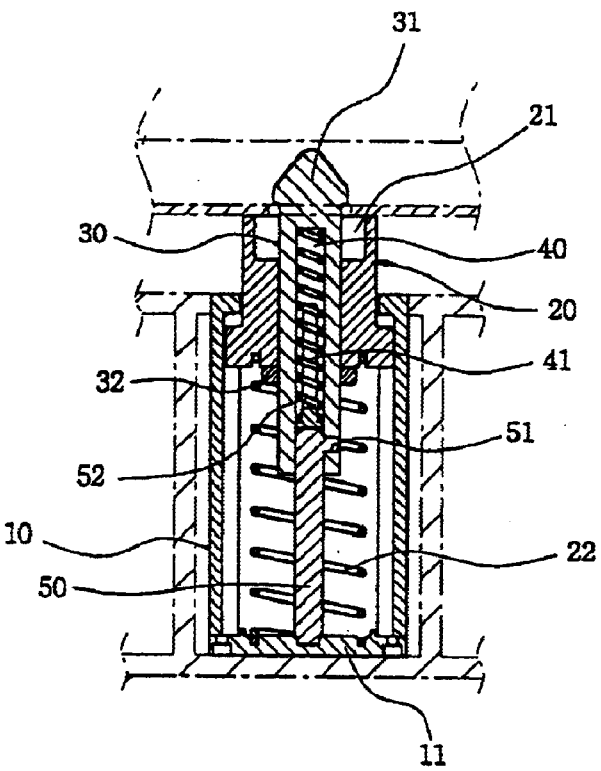
Figure 5C:
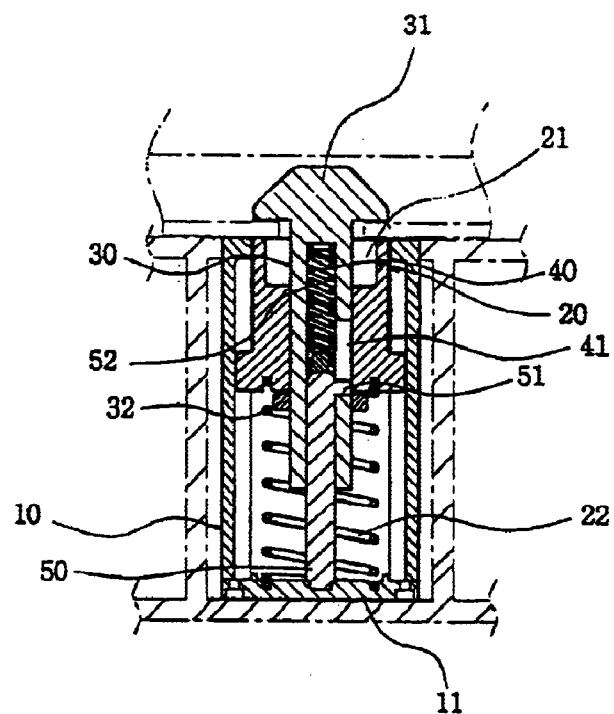

FIGS. 5a to 5c are sectional views, showing an operation of the container locking apparatus of this invention when the locking apparatus locks a container in position on the deck of a trailer As shown in the drawings, the housing 10 of this locking apparatus is set in the deck 1 of a trailer at a predetermined position. When the locking apparatus of this invention is free from any downward pressure, the actuator 20 and the locking bolt 30, normally biased upward by the first and second compression coil springs 22 and 52, are elastically and commonly projected upward from the top surface of the deck 1, thus accomplishing a normal position of the locking apparatus as shown in FIG. 5a.

That is, in the normal position of the locking apparatus of FIG. 5a, the actuator 20, movably set within the housing 10, is projected to its fully extended position outside the upper end of the housing 10 due to the restoring force of the first compression coil spring 22. The first spring 22 is set within the housing at a position between the lower surface of the actuator 20 and the bottom lid 11 of the housing 10 In the normal position, the locking bolt 30, movably set within the actuator 20, is also projected to its fully extended position outside the upper end of the actuator 20 due to the restoring force of the second compression coil spring 52. In such a case, the support shaft 50, fixedly standing at the center of the bottom lid 11, maintains the vertical position of the locking bolt 30, while the second spring 52 within the hole 40 of the locking bolt 30 biases the locking bolt 30 upward In the normal position of the locking apparatus, the projectional extension of the locking bolt 30 is limited by an engagement of the pin 51 of the support shaft 50 with the guide slit 41 of the locking bolt 30.

Such a normal position of the locking apparatus of FIG. 5a is designed such that the gap "d" between the lower surface of the actuator 20 and the upper surface of the stopper 32 of the locking bolt 30 is equal to the thickness "T" of a steel plate of the container 4 at a position around the locking hole 5. That is, the normal position of the locking apparatus is set to accomplish an expression "d=T". When a container 4 is seated on the deck 1 such that the locking hole 5 is aligned with the head 31 of the locking bolt 30, downward pressure is applied from the container 4 to the upper surface of the actuator 20 The actuator 20 is thus primarily moved down within the housing 10 by a predetermined distance equal to the gap "d" between the stopper 32 and the actuator 20, while the locking bolt 30 is not moved. Therefore, the head 31 of the locking bolt 30 is completely inserted into the locking hole 5 of the container 4 at the initial stage of loading the container 4 on the deck 1 The locking apparatus thus accomplishes a primary locking position, at which the stopper 32 comes into contact with the lower surface of the actuator 20 as shown in FIG. 5b. In such a case, the locking hole 5 formed on the steel plate of the container 4 is designed to have a rectangular profile capable of smoothly passing the head 31 of the locking bolt 30 through it when the head 31 is properly aligned with the hole 5.

When downward pressure is further applied from the container 4 to the actuator 20 of FIG. 5b, the locking bolt 30 is moved downward along with the actuator 20 since the stopper 32 comes into contact with the lower surface of the actuator 20. During such a downward movement of the locking bolt 30 along with the actuator 20, the locking bolt 30 is also rotated relative to the actuator 20 at a predetermined angle since the actuation pin 51 of the fixed support shaft 50 movably engages with the curved guide slit 41 of the rotatable locking bolt 30. The head 31 of the rotated locking bolt 30 thus crosses the rectangular locking hole 5 of the container 4, and so the container 4 is completely locked to the deck 1 The locking apparatus thus accomplishes a final locking position as shown in FIG. 5c. In such a case, the rotated angle of the locking bolt 30 relative to the fixed support shaft 50 has to be properly set such that the head 31 crosses the rectangular locking hole 5 of the container 4. Therefore, the locking apparatus of this invention is automatically operated in response to the weight of the container 4 to lock the container 4 in position on the deck 1 of the trailer.

Figure 6:
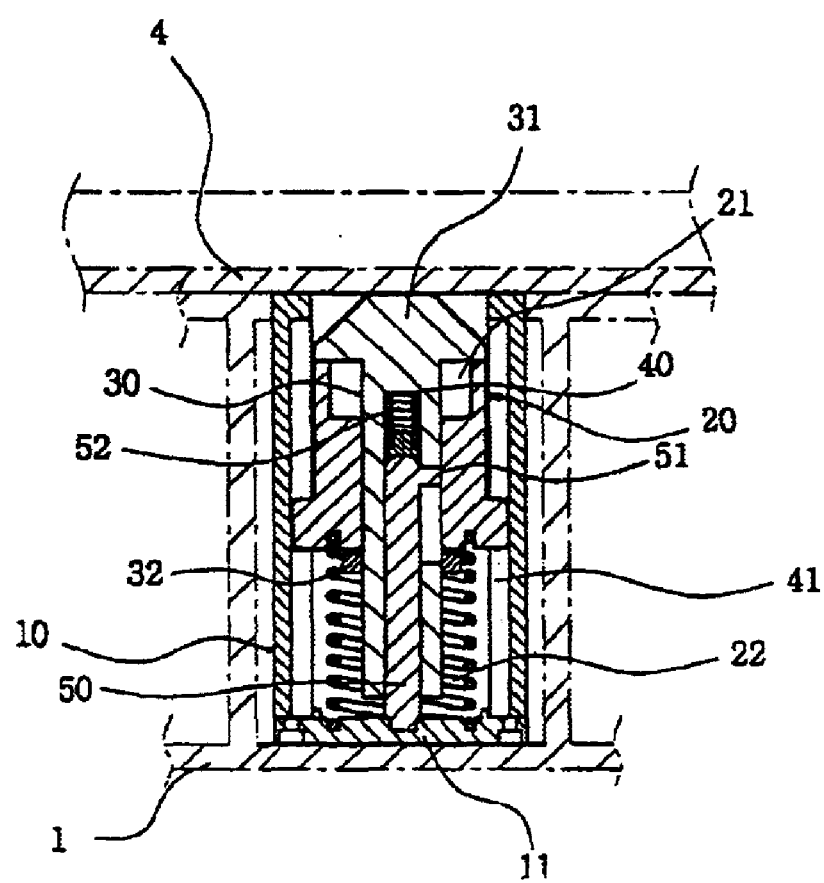
FIG. 6 is a position of the container locking apparatus of this invention when a container, which does not have any locking hole and is not necessary to be locked to the deck, is seated on the deck.

FIG. 6 is a position of the container locking apparatus of this invention when a container, which does not have any locking hole and is not necessary to be locked to the deck, is seated on the deck. As shown in the drawing, when such a container 4, which does not have any locking hole and is not necessary to be locked to the deck, is seated on the deck 1, the head 31 of the locking bolt 30 is fully retracted into the housing 10 to allow the lower surface of the container 4 to be stably laid on the top surface of the deck 1 without being interfered with the locking bolt 30. Such a fully retractable structure of the locking bolt 30 also protects the locking bolt 30 from unexpected damage or breakage.

Figure 7:
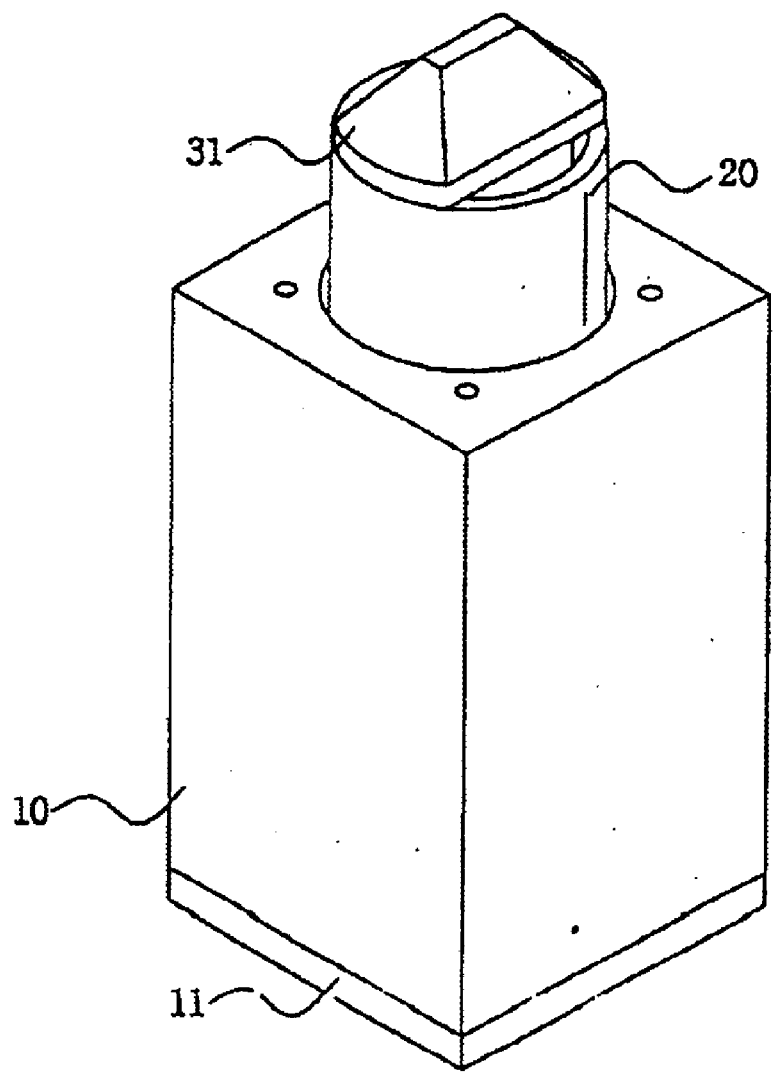
FIG. 7 is an exploded perspective view of an automatic container locking apparatus for trailers, with a housing of the apparatus altered in its profile in accordance with a modification of the preferred embodiment of this invention.

FIG. 7 is an exploded perspective view of an automatic container locking apparatus for trailers, with a housing of the apparatus altered in its profile in accordance with a modification of the preferred embodiment of this invention In this modification, the housing 10 is designed to have a rectangular cross-section different from the circular cross-section of FIG. 2. Of course, it should be understood that the housing 10 may be somewhat freely designed to have another profile in place of such a circular cross-section or rectangular cross-section without affecting the functioning of this invention.

When the container 4 is lifted upward from the deck 1 of the trailer to unload the container 4 from the deck 1, the downward pressure is released from the actuator 20, and so the locking apparatus automatically returns to its normal position due to the restoring force of the two compression coil springs 22 and 52. Therefore, it is possible for the locking apparatus to automatically release the container 4 when it is desired to unload the container 4 from the deck 1.

INDUSTRIAL APPLICABILITY

As described above, the present invention provides an automatic container locking apparatus for trailers This automatic container locking apparatus is installed in the deck of a trailer, and is automatically operable in response to the weight of a container to lock or unlock the container on the deck of the trailer. Therefore, the locking apparatus of this invention securely and safely holds the container on the deck while transporting the container on a road, and is convenient to workers while loading or unloading the container onto or from the deck of the trailer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic container locking apparatus for trailers, comprising:

a housing vertically set in a deck of a trailer at a predetermined position;

an actuator having a hollow structure with a central opening, said actuator being axially and movably set within said housing while being normally biased upward by a first spring such that the actuator is vertically extendible and retractable relative to an upper end of said housing;

a longitudinal locking bolt having a head at its upper end and movably and concentrically set within said central opening of the actuator such that the locking bolt is removably inserted into a locking hole of a container at said head, with a stopper externally formed on a sidewall of said locking bolt at a predetermined position to selectively come into contact with a lower surface of the actuator, thus allowing the locking bolt to be selectively and vertically movable in conjunction with a vertical movement of the actuator;

a hole longitudinally formed at a center of said locking bolt while extending from a lower end of the locking bolt to a predetermined depth, with a curved guide slit formed on the sidewall of said locking bolt to communicate with the locking bolt hole;

a support shaft vertically standing within said housing while being fixed to a bottom lid of the housing at its lower end, said support shaft being axially, upwardly and movably inserted into the hole of said locking bolt from a lower end of the locking bolt, with a second spring within the hole of the locking bolt to normally bias the locking bolt upward; and an actuation pin formed on a sidewall of said support shaft at an upper portion of said support shaft, and movably engaging with said curved guide slit of the locking bolt, thus allowing the locking bolt to be rotatable relative to the actuator at a predetermined angle when the locking bolt is vertically moved in response to external pressure applied from the container downward to the actuator.

* * * * *